United States Patent [19]

Duerdoth et al.

[11] 3,760,115

[45] Sept. 18, 1973

[54] CROSSPOINT ERROR DETECTION IN TIME DIVISION MULTIPLEX SWITCHING SYSTEMS

[75] Inventors: Winston Theodore Duerdoth, Ruislip; Charles Joseph Hughes, London, both of England

[73] Assignee: Her Majesty's Postmaster General, London, England

[22] Filed: Mar. 22, 1971

[21] Appl. No.: 126,518

Related U.S. Application Data

[62] Division of Ser. No. 782,541, Dec. 12, 1968, Pat. No. 3,622,705.

[30] Foreign Application Priority Data

Dec. 11, 1967 Great Britain .................. 56,149/67

[52] U.S. Cl.... 179/18 GF, 179/15 BF, 179/175.2 R

[51] Int. Cl. .............................................. H04j 3/14

[58] Field of Search .................. 179/18 GF, 15 AQ, 179/15 AT, 15 BF, 175.2 R; 340/166

[56] References Cited

UNITED STATES PATENTS

| | | | |
|---|---|---|---|
| 3,381,270 | 4/1968 | Huffman | 340/166 |
| 3,458,659 | 7/1969 | Sternung | 179/15 AQ |
| 3,337,849 | 4/1967 | Lowry | 340/166 |
| 3,586,784 | 6/1971 | Bhusri | 179/18 GF |
| 3,348,198 | 10/1967 | Winter | 179/175.2 R |
| 3,160,852 | 12/1964 | Simms | 179/18 GF |
| 3,588,367 | 6/1971 | White | 179/18 GF |

*Primary Examiner*—Kathleen H. Claffy
*Assistant Examiner*—David L. Stewart
*Attorney*—Hall & Houghton

[57] ABSTRACT

A circuit for detecting the operation of crosspoint switches in a time division multiplex switching system. The crosspoints are coded and when a crosspoint is operated its code is transmitted to a checking circuit that compares the code against a check code and produces an error signal in the event of a discrepancy.

3 Claims, 1 Drawing Figure

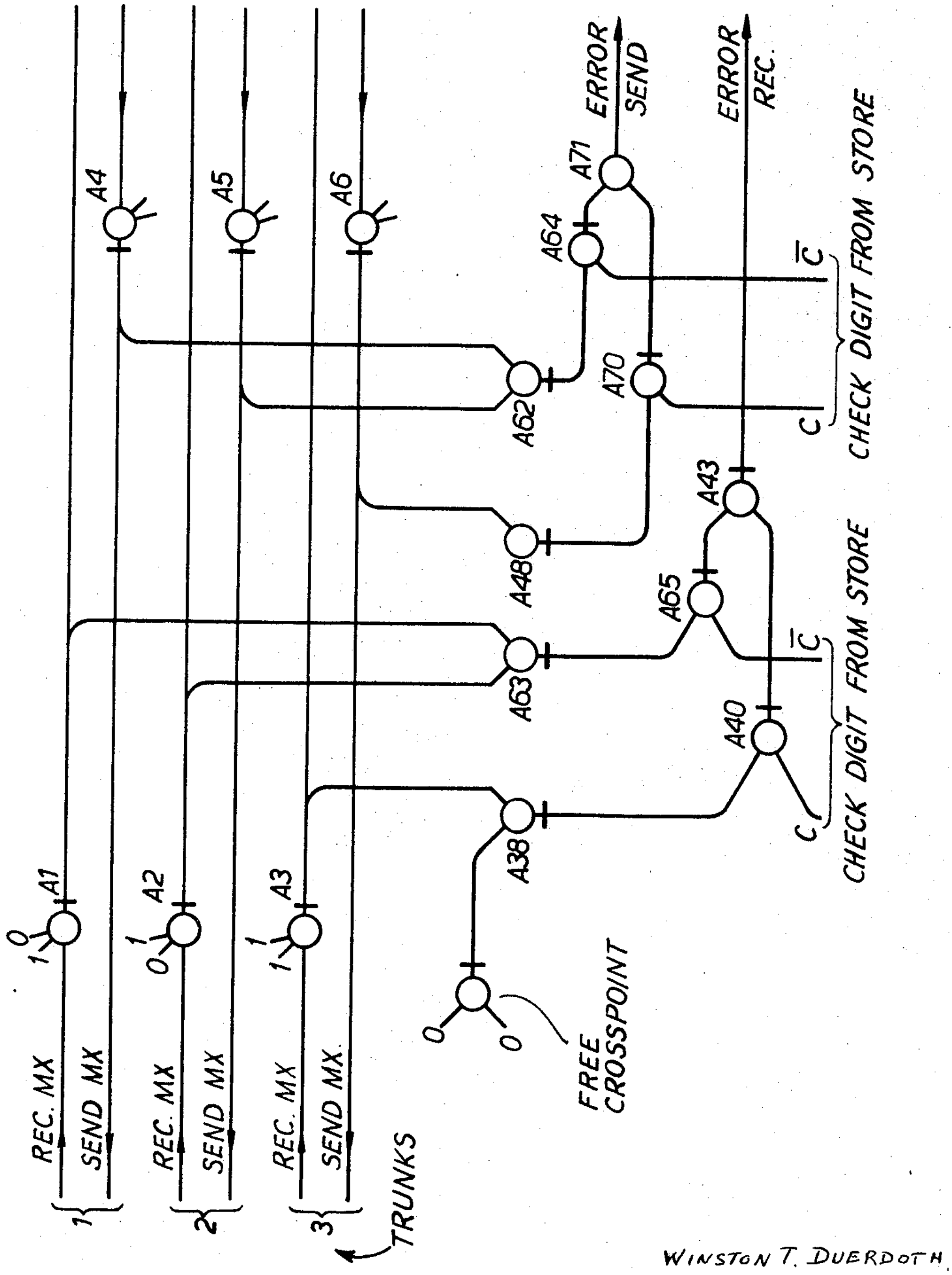
WINSTON T. DUERDOTH,
CHARLES J. HUGHES,
INVENTORS
BY Hall & Houghton
ATTORNEY

CROSSPOINT ERROR DETECTION IN TIME DIVISION MULTIPLEX SWITCHING SYSTEMS

This is a division of application Ser. No. 782,541, filed Dec. 12, 1968, now Pat. No. 3,622,705.

BACKGROUND OF THE INVENTION

This invention relates to error detection in time division multiplex telecommunication systems especially those in which pulse code modulation is used, for example the time division multiplex switching system described in the specification of co-pending Pat. application Ser. No. 782,541 by the present applicants and others (now Pat. No. 3,622,705 issued Nov. 23, 1971) and the content of which is incorporated herein by reference and constitutes the setting to which the present invention relates.

In the system described in Patent No. 3,622,705 communication between a first pulse coded modulated (P.C.M.) channel and a second P.C.M. channel is established through particular crosspoint connections in each of a number of switching stages working directly with the P.C.M. pulses. When a path selection has been made by the control equipment a store, described in column 2, lines 63–66 of specification No. 3,622,705, in each of the switching stages is written, at the appropriate channel slot time, with a series of binary coded digits characteristic of the particular crosspoint connection, in order to maintain the crosspoint connection at that time.

The object of the invention is to provide an arrangement for testing whether correct operation has taken place, and if not to cause an indication to be given and the connection to be cleared.

SUMMARY OF THE INVENTION

According to the present invention, in a time division multiplex switching system having at least one switching means incorporating a plurality of crosspoints, each of the latter is characterised by a code, and the system includes an error detection circuit to which the code is transmitted when the crosspoint is to be operated to check the identification of operated crosspoints. Details of the code appear in specification No. 3,622,705, column 3 lines 1–18.

The code may comprise a series of binary-coded digits to which the error detection circuit may add at least one check, binary-coded digit.

The detection circuit may comprise first gate circuits to which the outputs of the crosspoints are connected as inputs, second gate circuits to each of which the output of one of said first gate circuits is connected as an input, each said second gate circuit having at least one further input to which at least one check digit is applied, said check digit or digits being applied at the same time as a crosspoint connection is operated.

The check digit or digits is/are written into the switch store at the channel slot time together with the series of binary-coded digits characteristic of the switch crosspoint, the output of the store, in addition to maintaining the crosspoint operated, controlling the error detector circuit.

Error detection is carried out after the signal has passed through the crosspoint.

BRIEF DESCRIPTION OF THE DRAWINGS

The single FIGURE is a logic drawing of a circuit arrangement for a 3-bothway crosspoint switch.

DESCRIPTION OF THE PREFERRED EMBODIMENTS

It should be understood that these drawings represent integrated logic circuits, and unless otherwise stated are in the form of positive logic NAND gates, and that the operation is described in terms of voltage levels having two stable states represented by 0 and 1 conditions of binary logic. The more positive voltage is termed the HIGH state and represented by logical 1, and the more negative state as LOW and represented by logical 0.

Signal leads on the drawings are labelled in accordance with this nomenclature. For example, if the indication of an error arises as the result of a logical 1, the lead is labelled ERROR, whereas if the condition results from a logical 0, the lead is labelled ERROR.

In the drawing, the three trunks are each characterised by two binary digits written at the channel slot time into the switch store (now shown) together with a single check digit. The coding of the trunks is shown in Table 1 which is taken from FIG. 5 *c* of specification No. 3,622,705:

TABLE 1

TRUNK CODING

| I/C Trunks | Store Outputs | | |
|---|---|---|---|
| | | X point | Check |
| T1 | 1 | 0 | 1 |
| T2 | 0 | 1 | 1 |
| T3 | 1 | 1 | 0 |
| Free | 0 | 0 | 0 |

The following is a brief description of the detector circuit further details of which will be found in specification No. 3,622,705 at column 19 lines 63–75 and column 20 lines 1–5.

The REC. multiplex of trunk 3 is connected to crosspoint A3. When this crosspoint is operated from the store (not shown) its output goes forward on the REC. multiplex, and is also teed off as input to gate A 38 in the error detector circuit.

In accordance with Table 1 and the nomenclature adopted, the output from the store (not shown) for trunk 3 is coded as 1 (HIGH), 1(HIGH) and check digit 0(LOW). The output of crosspoint A3 is therefore LOW as input to gate A 38, the output of which is HIGH as input to gate A 40. The other input to gate A 40 is store lead C on which digit 0(LOW) is applied to inhibit the gate and prevent an output to gate A 43, so that no ERROR indication is given.

If due to an error the trunk code 110 for trunk 3 from the store was given as say, 100, then the crosspoint code 10 would operate crosspoint A1 of trunk 1, the LOW output of which is connected as input to gate A 63, whose HIGH output is connected as input to gate A 65. The other input to gate A 65 is store lead C, which for check digit 0 is HIGH. Gate A 65 is therefore not inhibited and an ERROR indication will be given on the output of gate A 43.

A similar technique is adopted on the other crosspoints, both of the REC. and SEND multiplexes.

A dummy crosspoint coded 00 is provided so that a complete parity check can be applied in accordance with Table 1.

It will be seen that the crosspoint outputs are grouped together to OR-gates, dependent upon the number of digit 1's in the binary code, i.e., trunks 1 and 2 are both connected to gate A 63.

We claim:

1. A time division muliplex communication system comprising in combination:

1. at least one switching means comprising a plurality of crosspoint switches,
2. storage means for receiving and storing the addresses of crosspoint switches together with additional crosspoint switch operation check information,
3. each said address comprising a series of binary coded digits and said check information comprising at least one further binary coded digit,
4. means including output leads from said storage means to said crosspoint switches for applying said stored addresses and said check information to said crosspoint switches to activate an addressed crosspoint switch, and
5. an error detection circuit for detecting an error in the operation of an addressed cross-point switch, said circuit comprising
   - A. gate means connected to the outputs of respective crosspoint switches for indicating that the associated crosspoint switch is in an operated condition, and
   - B. means connected to said gate means and connected to receive said check information from said storage means for indicating an error when the output of said gate means reflects operation inconsistent with the activation of the crosspoint switch indicated by said check information.

2. A system as claimed in claim 1, said gate means (A) comprising first gate circuits to which the outputs of said crosspoint switches are connected as inputs, and said means (B) comprises second gate circuits to each of which the outputs of one of the first gate circuits is connected as an input, each of said second gate circuits also having at least one further input connected to receive said check information from said storage means simultaneously with the operation of the crosspoint switch.

3. A system as claimed in claim 1, further comprising means for storing in said storage means said additional check information at the channel time at which the crosspoint switch identified thereby is operated.

* * * * *